United States Patent
Aoyama et al.

(10) Patent No.: US 9,017,757 B2
(45) Date of Patent: Apr. 28, 2015

(54) HYDROGEN SEPARATION MEMBRANE WITH A CARRIER, FUEL CELL AND HYDROGEN SEPARATION APPARATUS HAVING SAME, AND METHOD OF MANUFACTURING SAME

(75) Inventors: Satoshi Aoyama, Susono (JP); Yasuhiro Izawa, Mishima (JP); Kenji Kimura, Toyota (JP); Shinji Ohsawa, Kudamatsu (JP); Kazuo Yoshida, Kudamatsu (JP); Kouji Nanbu, Kudamatsu (JP)

(73) Assignees: Toyota Jidosha Kabushiki Kaisha, Toyota (JP); Toyo Kohan Co., Ltd., Tokyo (JP)

( * ) Notice: Subject to any disclaimer, the term of this patent is extended or adjusted under 35 U.S.C. 154(b) by 888 days.

(21) Appl. No.: 12/083,241

(22) PCT Filed: Oct. 25, 2006

(86) PCT No.: PCT/IB2006/002991
§ 371 (c)(1),
(2), (4) Date: Apr. 8, 2008

(87) PCT Pub. No.: WO2007/049130
PCT Pub. Date: May 3, 2007

(65) Prior Publication Data
US 2010/0047648 A1   Feb. 25, 2010

(30) Foreign Application Priority Data

Oct. 28, 2005   (JP) ................ 2005-314300

(51) Int. Cl.
*H01M 8/10* (2006.01)
*H01M 8/06* (2006.01)
(Continued)

(52) U.S. Cl.
CPC ........ *H01M 8/0625* (2013.01); *Y10T 29/49108* (2013.01); *B01D 53/228* (2013.01);
(Continued)

(58) Field of Classification Search
USPC .................... 429/535, 484; 427/115
See application file for complete search history.

(56) References Cited

U.S. PATENT DOCUMENTS

| | | |
|---|---|---|
| 5,318,688 A | 6/1994 | Najjar et al. |
| 5,393,325 A | 2/1995 | Edlund |

(Continued)

FOREIGN PATENT DOCUMENTS

| | | |
|---|---|---|
| DE | 112004002313 B4 | 9/2011 |
| EP | 1 334 764 A2 | 8/2003 |

(Continued)

OTHER PUBLICATIONS

Lide, David. CRC Handbook of Chemistry and Physics, 2003, CRC Press, 84th Edition, p. 4-26.*

(Continued)

*Primary Examiner* — Ula C. Ruddock
*Assistant Examiner* — Frank Chernow
(74) *Attorney, Agent, or Firm* — Oliff PLC (57) ABSTRACT

A method of manufacturing a hydrogen separation membrane with a carrier is characterized by including a first step of providing, between the hydrogen separation membrane and the carrier that supports the hydrogen separation membrane, a low-hardness metal membrane having a hardness that is lower than the hardness of the hydrogen separation membrane, and a second step of joining the hydrogen separation membrane, the low-hardness metal membrane, and the carrier by a cold joining method. In this case, it is possible to suppress the deformation of the hydrogen separation membrane, the low-hardness metal membrane, and the carrier and, as a result, it is possible to prevent damaging of the hydrogen separation membrane. The adhesion of the contact between the hydrogen separation membrane and the carrier is also improved. The result is that it is not necessary to increase the severity of the cold joining conditions.

12 Claims, 5 Drawing Sheets

(51) Int. Cl.
  *B01D 53/22* (2006.01)
  *B01D 67/00* (2006.01)
  *B01D 69/10* (2006.01)
  *B01D 71/02* (2006.01)
  *C01B 3/50* (2006.01)
  *H01M 4/94* (2006.01)

(52) U.S. Cl.
  CPC ............ *B01D67/0062* (2013.01); *B01D 69/10* (2013.01); *B01D 71/022* (2013.01); *C01B 3/505* (2013.01); *H01M 4/94* (2013.01); *H01M 8/0637* (2013.01); *H01M 8/0662* (2013.01); *Y02E 60/50* (2013.01)

(56) References Cited

U.S. PATENT DOCUMENTS

| | | | |
|---|---|---|---|
| 6,319,306 | B1 | 11/2001 | Edlund et al. |
| 2003/0148884 | A1 | 8/2003 | Ito et al. |
| 2003/0183080 | A1 | 10/2003 | Mundschau |
| 2004/0028602 | A1* | 2/2004 | Franz et al. ............... 423/648.1 |
| 2004/0244589 | A1 | 12/2004 | Bossard et al. |
| 2005/0072304 | A1 | 4/2005 | Etievant et al. |
| 2005/0076779 | A1* | 4/2005 | Saijo et al. ........................ 96/11 |
| 2005/0112057 | A1* | 5/2005 | Okuno et al. ................. 423/651 |
| 2006/0141320 | A1* | 6/2006 | Sato et al. ....................... 429/34 |
| 2006/0257704 | A1 | 11/2006 | Ogino et al. |

FOREIGN PATENT DOCUMENTS

| | | |
|---|---|---|
| FR | 2 820 988 A1 | 8/2002 |
| JP | A-2003-095617 | 4/2003 |
| JP | A-2003-182018 | 7/2003 |
| JP | A-2004-142354 | 5/2004 |
| JP | A-2004-176128 | 6/2004 |
| JP | A-2005-200273 | 7/2005 |
| JP | A-2006-055705 | 3/2006 |
| WO | WO 2004/084333 A1 | 9/2004 |

OTHER PUBLICATIONS

Penzhom et al., "Recent Results on Vacuum Pumping and Fuel Clean-up," *Fusion Engineering and Design*, vol. 36, pp. 75-89, 1997.

Nov. 8, 2011 Office Action issued in Japanese Patent Application No. 2005-314300 (with English-language translation).

* cited by examiner

HYDROGEN SEPARATION MEMBRANE WITH A CARRIER, FUEL CELL AND HYDROGEN SEPARATION APPARATUS HAVING SAME, AND METHOD OF MANUFACTURING SAME

BACKGROUND OF THE INVENTION

1. Field of the Invention

The present invention relates to a hydrogen separation membrane with a carrier, to a fuel cell and a hydrogen separation apparatus having same, and to a method of manufacturing same.

2. Description of Related Art

A fuel cell is an apparatus that obtains electrical energy, generally using hydrogen and oxygen as fuel. Because the fuel cell is superior with regard to the environment and also achieves a high energy efficiency, fuel cell development is being widely pursued as a future energy supply system.

Of fuel cells, those that use a solid electrolyte include a solid polymer fuel cell, a solid oxide fuel cell, and a hydrogen separation membrane cell and the like. The term hydrogen separation membrane fuel cell is used herein to mean a fuel cell having a densified hydrogen separation membrane. A densified hydrogen separation membrane is a layer that is formed by a hydrogen-permeable metal, and that functions also as an anode. A hydrogen separation membrane cell has a structure in which a proton-conductive electrolyte is laminated onto a hydrogen separation membrane. Hydrogen that is supplied to the hydrogen separation membrane is converted to protons, which migrate within the proton-conductive electrolyte and bond with oxygen at the cathode, so as to generate electricity in the hydrogen separation membrane cell.

The hydrogen separation membrane used in the hydrogen separation membrane cell uses a precious metal such as palladium. For this reason, in order to reduce cost, it is necessary to make the hydrogen separation membrane as thin as possible. In this case, it is necessary to strengthen the hydrogen separation membrane by providing a carrier sheet of stainless steel or the like, and also to make the hardness of the hydrogen separation membrane high. There was a disclosure of art, in Japanese Patent Application Publication No. JP-A-2003-95617, for making a diffusion joining between a hydrogen separation membrane and a carrier sheet. According to this art, the hydrogen separation membrane and the carrier sheet are fixed together by joining. Because there is no melting of the base material, it is possible to make the overall apparatus thin.

When using the above-noted art, however, it is necessary to heat the hydrogen separation membrane and the carrier sheet when performing diffusion joining. In this case, because of the difference in the thermal coefficients of expansion between the hydrogen separation membrane and the carrier sheet, there may be occurred damage to the hydrogen separation membrane. It is possible to envision joining the hydrogen separation membrane and the carrier sheet by the cold joining method, such as the cladding method or the like. However, it is difficult for a hydrogen separation membrane with a high hardness to be deformed. As a result, there is a loss in the adhesion of contact between the hydrogen separation membrane and the carrier sheet.

SUMMARY OF THE INVENTION

The invention has an object to provide a hydrogen separation membrane with a carrier, in which there is a highly adhesion between the hydrogen separation membrane and the carrier sheet, so as to prevent damage to the hydrogen separation membrane. The invention also has an object to provide a fuel cell using same, and a method of manufacturing the hydrogen separation membrane with a carrier and the fuel cell.

A method of manufacturing a hydrogen separation membrane with a carrier according to an embodiment of the present invention is characterized by providing, between the hydrogen separation membrane and a carrier that supports the hydrogen separation membrane, a low-hardness metal membrane having a hardness that is lower than the hardness of the hydrogen separation membrane, and joining the hydrogen separation membrane, the low-hardness metal membrane, and the carrier by the cold joining method.

In this method of manufacturing, a low-hardness metal membrane having a hardness that is lower than the hardness of the hydrogen separation membrane is provided between the hydrogen separation membrane and the carrier, and the hydrogen separation membrane, the low-hardness metal membrane, and the carrier are joined by the cold joining method. In this case, the temperature of the hydrogen separation membrane, the low-hardness metal membrane, and the carrier is lower than the temperature of the case of using a hot joining method. For this reason, the thermal load applied to the hydrogen separation membrane, the low-hardness metal membrane, and the carrier is made small. That is, there is almost no influence from differences in the thermal coefficients of expansion between the membranes. It is therefore possible to suppress deformation of the hydrogen separation membrane, the low-hardness metal membrane, and the carrier, and further possible to suppress metal diffusion at the joining boundary. As a result, it is possible to prevent damage to the hydrogen separation membrane.

Because the low-hardness metal membrane having a hardness that is lower than that of the hydrogen separation membrane and that also is easily deformed is sandwiched between the hydrogen separation membrane and the carrier, there is an improvement in the adhesion between the hydrogen separation membrane and the carrier. The result of this is that it is not necessary to increase the severity of the cold joining conditions. That is, in addition to being able to set the joining temperature to a low temperature, it is possible to set a low joining load.

In the above-noted constitution, a low-hardness metal membrane may be formed on at least one of the joining surfaces of the hydrogen separation membrane and the carrier. Before joining the hydrogen separation membrane, the low-hardness metal membrane, and the carrier by a cold joining method, the joining surfaces of the hydrogen separation membrane, the low-hardness metal membrane, and the carrier may be subjected to activation processing. In this case, there is an improvement in the adhesion between the hydrogen separation membrane and the carrier.

The low-hardness metal membrane may have hydrogen permeability. Also, the hydrogen separation membrane can include palladium or a palladium alloy, and the low-hardness metal membrane may include a palladium alloy or a metal having a hardness that is lower than the hardness of the hydrogen separation membrane. Additionally, the hydrogen separation membrane may include a palladium alloy having a hardness that is higher than that of substantially pure palladium, and the low-hardness metal membrane may be made of substantially pure palladium. In this case, it is possible to suppress a reduction in the hydrogen permeability of the hydrogen separation membrane.

In the above-noted method of manufacturing, the carrier may further have a through hole in the membrane thickness direction.

A method of manufacturing a fuel cell according to an embodiment of the invention is characterized in that a proton-conductive electrolyte membrane and cathode are formed on the hydrogen separation membrane of the hydrogen separation membrane with a carrier manufactured by the above-described manufacturing method. In this manufacturing method, a low-hardness metal membrane having a hardness that is lower than the hardness of the hydrogen separation membrane is provided between the hydrogen separation membrane and the carrier, the hydrogen separation membrane, the low-hardness metal membrane, and the carrier are joined by the cold joining method, and a proton-conductive electrolyte membrane and cathode are formed on the hydrogen separation membrane.

In this case, the temperature of the hydrogen separation membrane, the low-hardness metal membrane, and the carrier is lower than the temperature of the case of using a hot joining method. Accordingly, the thermal load applied to the hydrogen separation membrane, the low-hardness metal membrane, and the carrier is made small. That is, there is almost no influence from differences between the thermal coefficients of expansion of the various membranes. It is therefore possible to suppress the deformation of the hydrogen separation membrane, the low-hardness metal membrane, and the carrier. As a result, it is possible to prevent damage to the hydrogen separation membrane. Also, because the low-hardness metal membrane having a hardness that is lower than that of the hydrogen separation membrane and that is also easily deformed is sandwiched between the hydrogen separation membrane and the carrier, there is an improvement in the adhesion between the hydrogen separation membrane and the carrier. The result of this is that it is not necessary to increase severity of the cold joining condition. That is, in addition to being able to set the joining temperature to a low temperature, it is possible to set a low joining load.

A method of manufacturing a hydrogen separation apparatus according to an embodiment of the invention is characterized in that a gas flow passage is provided above the hydrogen separation membrane of the hydrogen separation membrane with a carrier and below the carrier of the hydrogen separation membrane with a carrier manufactured by the above-described manufacturing method. In this manufacturing method, a low-hardness metal membrane having a hardness that is lower than the hardness of the hydrogen separation membrane is provided between the hydrogen separation membrane and the carrier, the hydrogen separation membrane, the low-hardness metal membrane, and the carrier are joined by the cold joining method, and a gas flow passage is provided above the hydrogen separation membrane and below the carrier.

In this case, the temperature of the hydrogen separation membrane, the low-hardness metal membrane, and the carrier is lower than the case of using a hot joining method. Accordingly, the thermal load applied to the hydrogen separation membrane, the low-hardness metal membrane, and the carrier is made small. That is, there is almost no influence from differences in the thermal coefficients of expansion between the membranes. It is therefore possible to suppress deformation of the hydrogen separation membrane, the low-hardness metal membrane, and the carrier. As a result, it is possible to prevent damage to the hydrogen separation membrane. Also, because a low-hardness metal membrane having a hardness that is lower than that of the hydrogen separation membrane and that is also easily deformed is sandwiched between the hydrogen separation membrane and the carrier, there is an improvement in the adhesion between the hydrogen separation membrane and the carrier. The result of this is that it is not necessary to increase the severity of the cold joining condition. That is, in addition to being able to set the joining temperature to a low temperature, it is possible to set a low joining load.

A hydrogen separation membrane with a carrier according to an embodiment of the invention is characterized by having a hydrogen separation membrane, a carrier that supports the hydrogen separation membrane, and a low-hardness metal membrane that is laminated onto the carrier and that has a hardness that is lower than the hardness of the hydrogen separation membrane, wherein the carrier, the low-hardness metal membrane, and the hydrogen separation membrane are joined by the cold joining method. In this constitution, a low-hardness metal membrane having a hardness that is lower than the hydrogen separation membrane and that is also easily deformed is sandwiched between the hydrogen separation membrane and the carrier. Accordingly, there is an improvement in the intimacy of contact between the hydrogen separation membrane and the carrier.

The low-hardness metal membrane may have hydrogen permeability. The hydrogen separation membrane may include palladium or a palladium alloy, and the low-hardness metal membrane may include a metal or a palladium alloy having a hardness that is lower than the hardness of the hydrogen separation membrane. Additionally, the hydrogen separation membrane may include a palladium alloy having a hardness that is higher than substantially pure palladium, and the low-hardness metal membrane may be made of substantially pure palladium. In this case, it is possible to suppress a loss in the hydrogen permeability of the hydrogen separation membrane.

In the hydrogen separation membrane with a carrier described above, the carrier may have a through hole in the membrane thickness direction.

A fuel cell according to an embodiment of the invention is characterized by having the above-noted hydrogen separation membrane with a carrier, a proton-conductive electrolyte membrane formed on the hydrogen separation membrane of the hydrogen separation membrane with a carrier, and a cathode formed on the proton-conductive electrolyte membrane. In the fuel cell according to the present invention, a low-hardness metal membrane having a hardness that is lower than the hydrogen separation membrane and that is also easily deformed is sandwiched between the hydrogen separation membrane and the carrier. Accordingly, there is an improvement in the intimacy of contact between the hydrogen separation membrane and the carrier.

A hydrogen separation apparatus according to an embodiment of the invention is characterized by having the above-noted hydrogen separation membrane with a carrier, and a gas flow passage formed above the hydrogen separation membrane of the hydrogen separation membrane with a carrier and below the carrier of the hydrogen separation membrane with a carrier. In this constitution, a low-hardness metal membrane having a hardness that is lower than the hydrogen separation membrane and that is also easily deformed is sandwiched between the hydrogen separation membrane and the carrier. Accordingly, there is an improvement in the adhesion between the hydrogen separation membrane and the carrier.

According to the invention it is possible to prevent damage to the hydrogen separation membrane, and there is an improvement in the adhesion between the hydrogen separation membrane and the carrier. As a result, it is possible to fabricate a hydrogen separation membrane with a carrier having superior durability.

BRIEF DESCRIPTIONS OF THE DRAWINGS

The foregoing and/or further objects, features, and advantages of the present invention will become more apparent from the following description of preferred embodiments, with reference to the accompanying drawings, in which like numerals are used to represent like elements, and wherein:

FIG. 2A to FIG. 2G are manufacturing flow diagrams for describing a method of manufacturing a hydrogen separation membrane with a carrier in accordance with a second embodiment of the invention;

DETAILED DESCRIPTION OF THE PREFERRED EMBODIMENTS

In the following description, the present invention will be described in more detail in terms of exemplary embodiments.

Figure 1A:
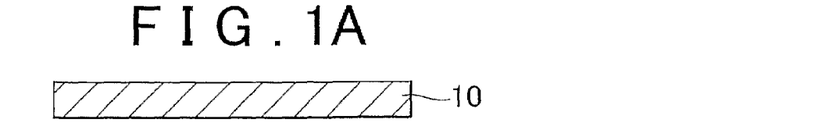
FIG. 1 to FIG. 1F are manufacturing flow diagrams for describing a method of manufacturing a hydrogen separation membrane with a carrier in accordance with a first embodiment of the invention.

FIG. 1A to FIG. 1F are manufacturing flow diagrams for describing the method of manufacturing a hydrogen separation membrane with carrier 40 according to the first embodiment. As shown in FIG. 1A, a hydrogen separation membrane 10 is first prepared. The hydrogen separation membrane 10 is made from a hydrogen-permeable metal. It is possible to use, for example, a palladium alloy or the like as the hydrogen-permeable metal. The membrane thickness of the hydrogen separation membrane 10 is, for example, 10 μm to 200 μm, and more desirably is 50 μm to 100 μm.

Figure 1B:
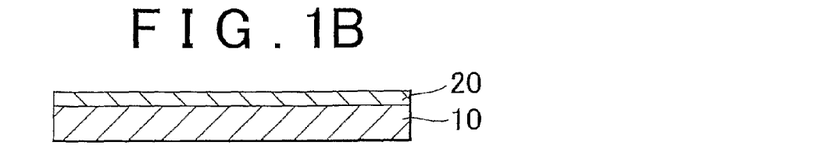

Next, as shown in FIG. 1B, a low-hardness metal membrane 20 having hydrogen permeability is formed on one surface of the hydrogen separation membrane 10, by a method of plating, vapor deposition, or the like. The hydrogen-permeable low-hardness metal membrane 20 may be laminated on one surface of the hydrogen separation membrane 10 by the cold joining method. The thickness of the low-hardness metal membrane 20 is, for example, 5 μm to 30 μm, and more desirably is 10 μm to 20 μm. The low-hardness metal membrane 20 has a hardness (Vickers hardness, same used hereinafter) that is lower than that of the hydrogen separation membrane 10. In this embodiment, the low-hardness metal membrane 20 is made of substantially pure palladium. In this case, the term substantially pure palladium is used to mean palladium having a purity of approximately 99.9%. Examples of the hardnesses of substantially pure palladium and palladium alloys that can be used as the hydrogen separation membrane 10 are shown in Table 1.

TABLE 1

| Composition (% by weight) | Vickers Hardness |
| --- | --- |
| Pd | 45 |
| Pd77% Ag23% | 90 |
| Pd76% Pt24% | 55 |
| Pd60% Cu40% | 170 |

TABLE 1-continued

| Composition (% by weight) | Vickers Hardness |
| --- | --- |
| Pd86% Ni14% | 160 |
| Pd89% Gd11% | 250 |
| Pd70% Au30% | 85 |
| Pd45% Au55% | 90 |
| Pd65% Au30% Rh5% | 100 |
| Pd70% Ag25% Rh5% | 130 |

Figure 1C:
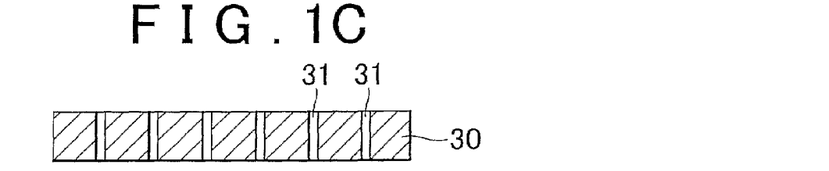

Next, the carrier 30 is prepared, as shown in FIG. 1C. The carrier 30 is made, for example, of a metal such as stainless steel or the like. The thickness of the carrier 30 is, for example, 50 μm to 300 μm. In this embodiment, a plurality of through holes 31 are formed in the carrier 30 for the purpose of supplying hydrogen to the hydrogen separation membrane 10.

Figure 1D:
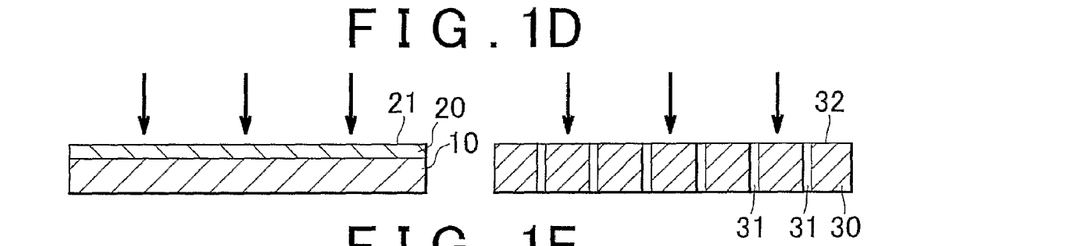

Next, as shown in FIG. 1D, activation processing is performed of the joining surface 32 of the carrier 30 (one surface of the carrier 30) and the joining surface 21 of the low-hardness metal membrane 20 (the surface of the low-hardness metal membrane 20 that is opposite the hydrogen separation membrane 10). The activation processing is done by ion irradiation processing with an inert gas in an atmosphere of an inert gas such as argon or the like. In this case, the surface parts of the joining surface 32 and the joining surface 21 are removed so that the oxides that exist mainly in the surface parts are eliminated. It is possible to use helium, neon, or argon or the like as the inert gas, and it is particularly desirable to use argon gas, from the standpoint of economy. As a result, activated surfaces of the carrier 30 and the low-hardness metal membrane 20 with almost no oxides are exposed. The temperature of the hydrogen separation membrane 10, the low-hardness metal membrane 20, and the carrier 30 is approximately 200° C., caused by collision by argon ions when performing activation processing using argon ion irradiation.

Figure 1E:
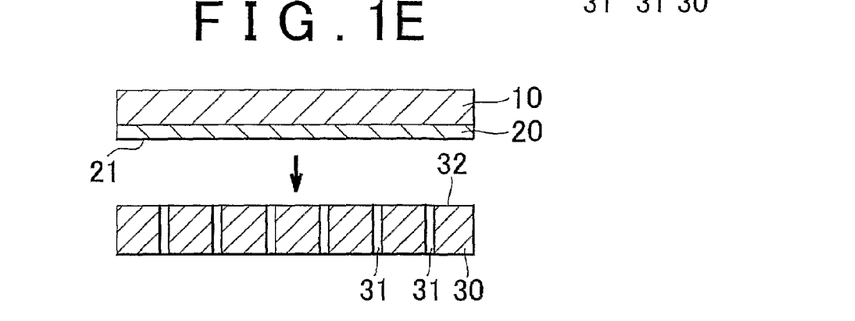
Figure 1F:
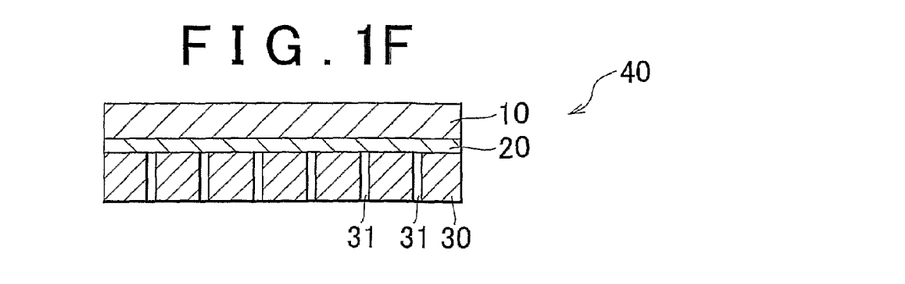

Next, as shown in FIG. 1E, the hydrogen separation membrane 10 and the low-hardness metal membrane 20 are placed on the carrier 30 so that the joining surface 21 and the joining surface 32 oppose one another, and the cold joining method is used to join the hydrogen separation membrane 10, the low-hardness metal membrane 20, and the carrier 30. By this process, as shown in FIG. 1F, the hydrogen separation membrane with a carrier 40 is completed.

In this embodiment, the temperature of the hydrogen separation membrane 10, the low-hardness metal membrane 20, and the carrier 30 is lower than the case of using a hot joining method. In this case, the thermal load applied to the hydrogen separation membrane 10, the low-hardness metal membrane 20, and the carrier 30 is made smaller. That is, there is almost no influence from differences in the thermal coefficients of expansion between the various membranes. Because of this, it is possible to suppress deformation of the hydrogen separation membrane 10, the low-hardness metal membrane 20, and the carrier 30, thereby making it possible to prevent damage to the hydrogen separation membrane 10.

The low-hardness metal membrane 20, which has a hardness that is lower than the hydrogen separation membrane 10 and that is also easily deformed, is sandwiched between the hydrogen separation membrane 10 and the carrier 30. For this reason, there is an improvement in the adhesion between the hydrogen separation membrane 10 and the carrier 30, and there is no need to increase the severity of the cold joining condition. That is, in addition to being able to set the joining temperature to a low temperature, it is possible to set a low joining load.

In this embodiment, the low-hardness metal membrane 20 has hydrogen permeability. As a result, it is possible to suppress a loss of hydrogen permeability of the hydrogen separation membrane 10. The low-hardness metal membrane 20 may also be formed within the through holes 31 of the carrier 30, in which case there is an improvement in the strength of the low-hardness metal membrane 20. Accordingly, it is possible to further reduce the thickness of the hydrogen separation membrane 10.

Although in this embodiment pure palladium is used as the low-hardness metal membrane 20 and a palladium alloy is used as the hydrogen separation membrane 10, there is no particular restriction in this regard. As long as the metal has hydrogen permeability and has a hardness that is lower than the hardness of the hydrogen separation membrane 10, it may be used as low-hardness metal membrane 20. For example, it is possible to apply a palladium alloy having a hardness that is lower than the palladium alloy used in the hydrogen separation membrane 10. Also, as long as the metal has hydrogen permeability it can be used as the hydrogen separation membrane 10.

The method of manufacturing a hydrogen separation membrane with a carrier 40a according to the second embodiment of the present invention will now be described. FIG. 2A to FIG. 2F are manufacturing flow diagrams for describing the method of manufacturing a hydrogen separation membrane with carrier 40a. Constituent elements having the same numerals as shown for the first embodiment are made from similar materials as the first embodiment.

Figure 2A:
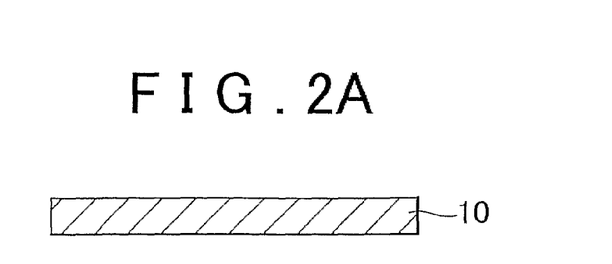
Figure 2B:
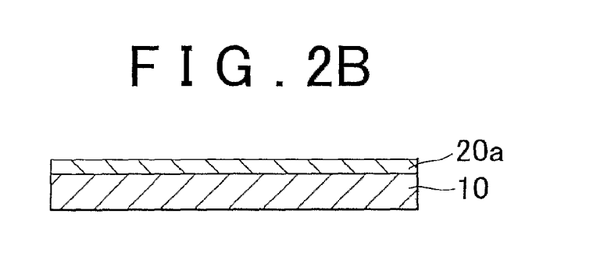

First, as shown in FIG. 2A, the hydrogen separation membrane 10 is prepared. Next, as shown in FIG. 2B, a low-hardness metal membrane 20a having hydrogen permeability is formed on one surface of the hydrogen separation membrane 10, by a method of plating, vapor deposition, or the like. The low-hardness metal membrane 20a has a hardness that is lower than that of the hydrogen separation membrane 10. It is possible to use, for example, copper, nickel, tin, zinc or aluminum as the low-hardness metal membrane 20a In this embodiment, the low-hardness metal membrane 20a is made of copper. The thickness of the low-hardness metal membrane 20a is, for example, approximately 10 μm.

Figure 2C:
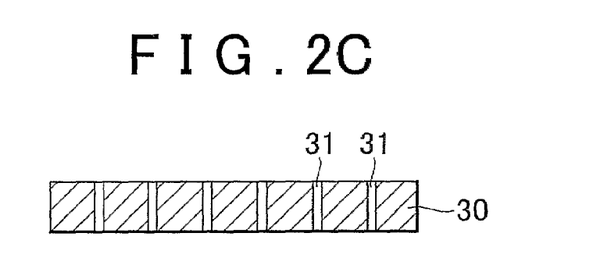
Figure 2D:
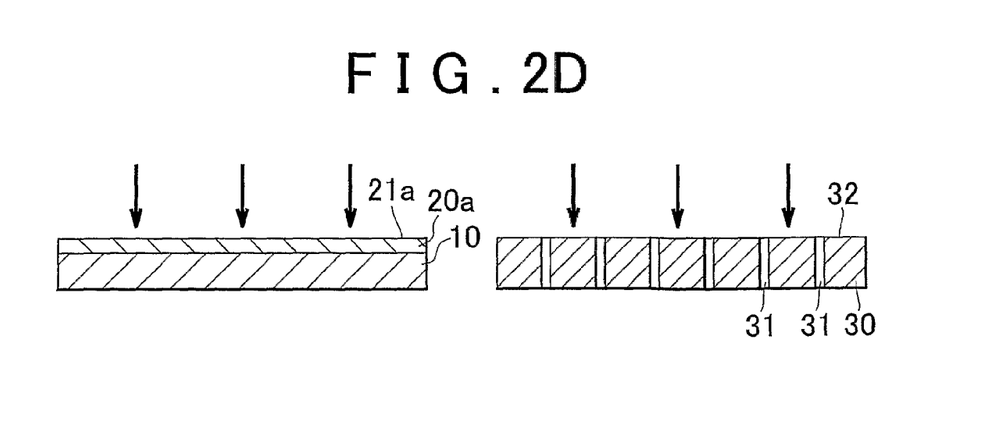
Figure 2E:
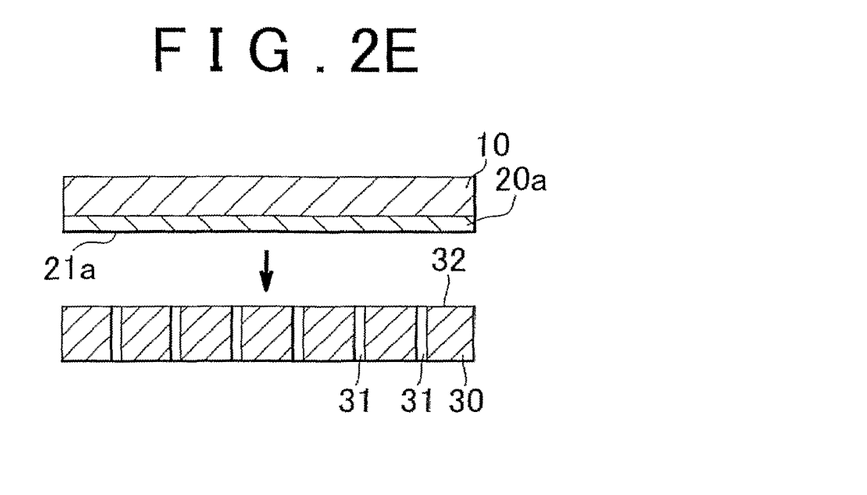

Next, as shown in FIG. 2C, the carrier 30 is prepared. Next, as shown in FIG. 2D, the activation processing is performed of the joining surface 32 of the carrier 30 and the joining surface 21a of the low-hardness metal membrane 20a (the surface of the low-hardness metal membrane 20a that is opposite from the hydrogen separation membrane 10). The activation processing is done by ion irradiation processing with an inert gas in an atmosphere of an inert gas such as argon or the like. In this case, the surface parts of the joining surface 32 and the joining surface 21a are removed so that the oxides that exist mainly in the surface parts are eliminated. It is possible to use helium, neon, or argon or the like as the inert gas, and it is particularly desirable to use argon, from the standpoint of economy. Next, as shown in FIG. 2E, the hydrogen separation membrane 10 and the low-hardness metal membrane 20a are placed on the carrier 30 so that the joining surface 32 and the joining surface 21a, which are activated, oppose one another. Then, the cold joining method is used to join the hydrogen separation membrane 10, the low-hardness metal membrane 20a, and the carrier 30.

Figure 2F:
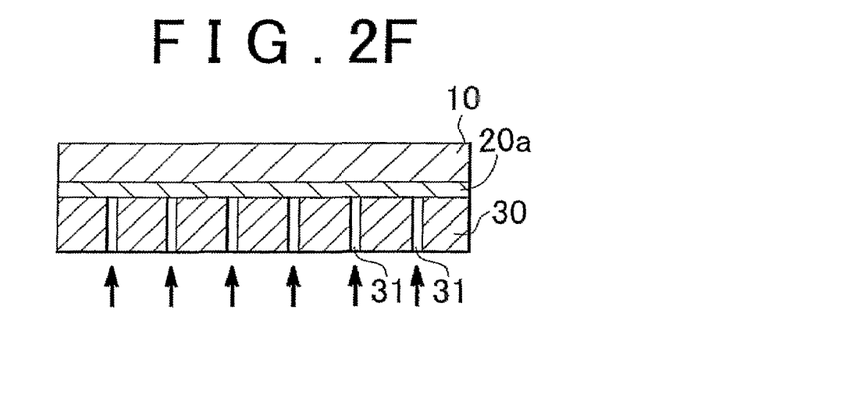
Figure 2G:
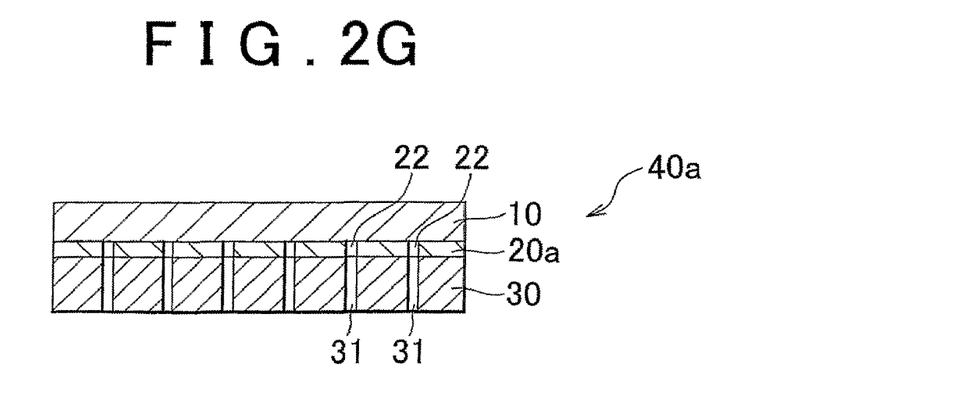

Next, as shown in FIG. 2F, etching processing is performed of the exposed part of the low-hardness metal membrane 20a exposed via the through holes 31. By this processing, a plurality of through holes 22 for the purpose of supplying hydrogen to the hydrogen separation membrane 10 are formed in the low-hardness metal membrane 20a By the above process steps, as shown in FIG. 2G, the hydrogen separation membrane with a carrier 40a is completed. In this embodiment there is no need to use a high-cost hydrogen-permeable metal as the low-hardness metal membrane 20a. Therefore, it is possible to reduce the cost of the hydrogen separation membrane with a carrier 40a. Also, any metal having a hardness that is lower than the hardness of the hydrogen separation membrane 10 can be used as the low-hardness metal membrane 20a.

Although the low-hardness metal membrane 20 and 20a, respectively, of the first embodiment and second embodiment were joined to the carrier 30 after being formed on the hydrogen separation membrane 10, they may alternatively be joined to the hydrogen separation membrane 10 after being formed on the carrier 30. Additionally, the low-hardness metal membrane 20 and 20a may be formed on both the hydrogen separation membrane 10 and the carrier 30. In this case as well, there is an improvement in the adhesion between the hydrogen separation membrane 10 and the carrier 30.

Figure 3A:
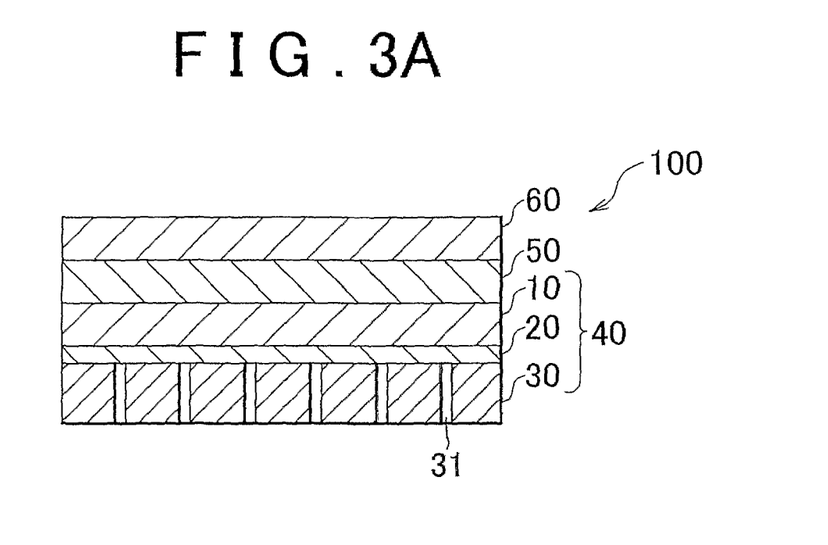
FIG. 3A and FIG. 3B are drawings for describing a fuel cell according to a third embodiment of the invention.
Figure 3B:
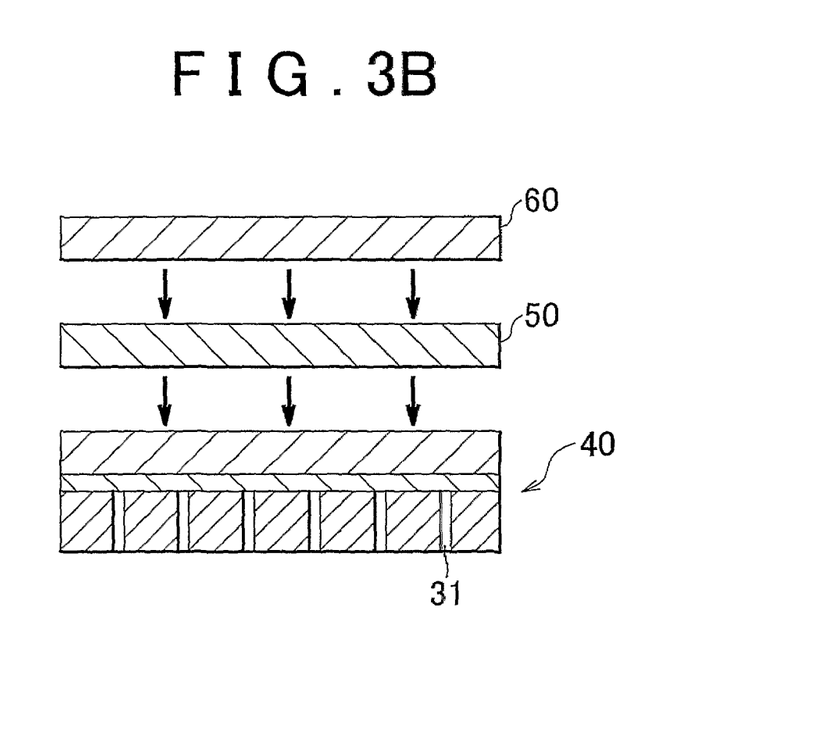

Next, a fuel cell 100 according to the third embodiment of the present invention will be described. FIG. 3A and FIG. 3B are drawings for describing the fuel cell 100. FIG. 3A is a schematic cross-sectional view of the fuel cell 100, and FIG. 3B is a drawing for describing the method of manufacturing the fuel cell 100. Constituent elements having the same numerals as shown for the first and second embodiments are made from similar materials as the first and second embodiments.

As shown in FIG. 3A, a proton-conductive electrolyte membrane 50 and a cathode 60 are formed in sequence on hydrogen separation membrane 10 of the hydrogen separation membrane with a carrier 40 manufactured by the method of manufacturing of the first embodiment. As shown in FIG. 3B, a proton-conductive electrolyte membrane 50 and a cathode 60 are formed in sequence onto the hydrogen separation membrane 10 by sputtering or the like, so as to enable manufacturing the fuel cell 100.

The operation of the fuel cell 100 will now be described. First, a fuel gas containing hydrogen is supplied to the low-hardness metal membrane 20 via a plurality of through holes 31 in the carrier 30. The hydrogen within the fuel gas passes through the low-hardness metal membrane 20 and the hydrogen separation membrane 10 and reaches the proton-conductive electrolyte membrane 50. Hydrogen that reaches the proton-conductive electrolyte membrane 50 is separated into protons and electrons. The protons are conducted through the proton-conductive electrolyte membrane 50 and reach the cathode 60.

Oxidizing gas that contains oxygen is supplied to the cathode 60. At the cathode 60, water is synthesized and electricity is generated from the oxygen in the oxidizing gas and protons that have reached the cathode 60. The generated electrical power is recovered via a separator, which is not illustrated. By the above-noted operation, the fuel cell 100 generates electrical power. A hydrogen separation membrane with a carrier 40a manufactured by method of manufacturing according to the second embodiment can be used in place of the hydrogen separation membrane with a carrier 40. In this case, the fuel gas is supplied to the hydrogen separation membrane 10 via the plurality of through holes 31 and via the plurality of through holes 22a of the low-hardness metal membrane 20a.

Figure 4A:
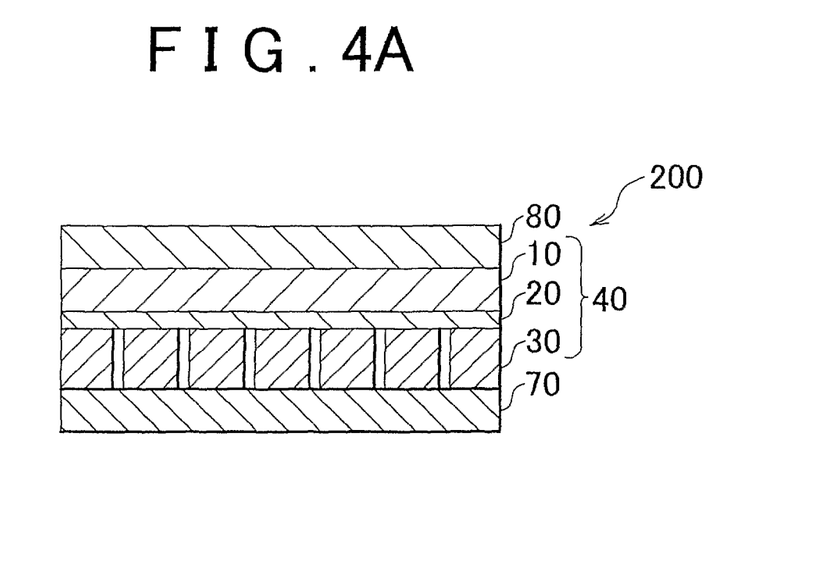
FIG. 4A and FIG. 4B are drawings for describing a hydrogen separation apparatus according to a fourth embodiment of the invention.
Figure 4B:
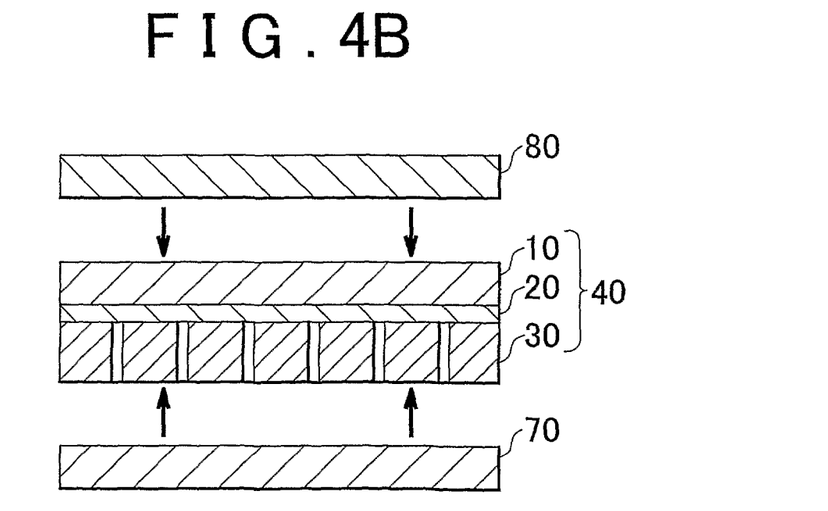

A hydrogen separation apparatus 200 according to the fourth embodiment of the invention will now be described. FIG. 4A and FIG. 4B are drawings for describing the hydrogen separation apparatus 200. FIG. 4A is a schematic cross-sectional view of the hydrogen separation apparatus 200, and FIG. 4B is a drawing for describing the method of manufacturing the hydrogen separation apparatus 200. Constituent elements having the same numerals as shown for the first and second embodiments are made from similar materials as the first and second embodiments.

As shown in FIG. 4A, a flow passage plate 80 is formed on the hydrogen separation membrane 10 side of the hydrogen separation membrane with a carrier 40 manufactured by the method of manufacturing according to the first embodiment, and a flow passage plate 70 is formed on the carrier 30 side of the hydrogen separation membrane with a carrier 40 manufactured by the method of manufacturing according to the first embodiment. The flow passage plate 70 is a plate in which is formed a flow passage for the purpose of supplying gas containing hydrogen to the hydrogen separation membrane with a carrier 40, and the flow passage plate 80 is a plate in which is formed a flow passage for the purpose of recovering hydrogen that is separated at the hydrogen separation membrane with a carrier 40.

As shown in FIG. 4B, the flow passage plate 70 is joined to the surface of the carrier 30 on the side opposite from the low-hardness metal membrane 20 and the flow passage plate 80 is joined to the surface of the hydrogen separation membrane 10 on the side opposite from the low-hardness metal membrane 20, thereby enabling manufacture of the hydrogen separation apparatus 200.

The operation of the fuel cell 200 will now be described. First, a fuel gas containing hydrogen is supplied from the flow passage within the flow passage plate 70 to the low-hardness metal membrane 20 via a plurality of through holes 31 in the carrier 30. The hydrogen in the fuel gas passes through the low-hardness metal membrane 20 and the hydrogen separation membrane 10 and reaches the flow passage plate 80. Hydrogen that has reached the flow passage plate 80 is recovered via the flow passage of the flow passage plate 80. By this operation, it is possible to separate hydrogen that is contained in the fuel gas. A hydrogen separation membrane with a carrier 40a manufactured by method of manufacturing according to the second embodiment can be used in place of the hydrogen separation membrane with a carrier 40. In this case, the fuel gas is supplied to the hydrogen separation membrane 10 via the plurality of through holes 31 and via the plurality of through holes 22 of the low-hardness metal membrane 20a.

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, fewer, or only a single element, are also within the spirit and scope of the invention.

What is claimed is:

1. A method of manufacturing a hydrogen separation membrane, comprising:
   forming, on a hydrogen separation membrane having hydrogen permeability, a low-hardness metal membrane having a hardness that is lower than the hardness of the hydrogen separation membrane; and
   joining the hydrogen separation membrane on which the low-hardness metal membrane is formed to a carrier by cladding so that the low-hardness metal membrane and the carrier are joined;
   wherein
   the carrier comprises a metal and a plurality of first open through holes in the thickness direction thereof,
   the plurality of first open through holes are perpendicular to the low-hardness metal membrane, and
   the low-hardness metal membrane is not joined on an interior surface of the plurality of first open through holes.

2. The method according to claim 1, wherein:
the low-hardness metal membrane has hydrogen permeability.

3. The method according to claim 1, wherein:
the hydrogen separation membrane includes palladium or a palladium alloy; and
the low-hardness metal membrane includes a palladium alloy.

4. The method according to claim 1, wherein:
the hydrogen separation membrane includes a palladium alloy having a hardness that is higher than that of substantially pure palladium, and the low-hardness metal membrane is made of substantially pure palladium.

5. The method according to claim 1, further comprising:
forming the plurality of first open through holes in the carrier before joining the carrier to the hydrogen separation membrane.

6. A method of manufacturing a fuel cell, comprising:
forming a proton-conductive electrolyte membrane and cathode on the hydrogen separation membrane of the hydrogen separation membrane manufactured by the method according to claim 1.

7. A method of manufacturing a hydrogen separation apparatus, comprising:
providing a first gas flow passage above the hydrogen separation membrane of the hydrogen separation membrane manufactured by the method according to claim 1 and a second gas flow passage below the carrier of the hydrogen separation membrane.

8. The method according to claim 1, wherein:
the hydrogen separation membrane is made from a palladium alloy, and
the low-hardness metal membrane is made of substantially pure palladium or a palladium alloy and has hydrogen permeability.

9. The method according to claim 1, further comprising performing activation processing on joining surfaces of each of the low-hardness metal membrane and the carrier, wherein the activation processing removes surface parts of the joining surfaces so that oxides that exist in the surface parts are eliminated, resulting in activated joining surfaces with almost no oxides being exposed.

10. The method according to claim 1, wherein the low-hardness metal membrane contains no through holes.

11. The method according to claim 1, wherein the low-hardness metal membrane is joined to the carrier by applying a load, and the low-hardness metal membrane is a solid membrane when joined to the carrier.

12. The method according to claim 1, further comprising forming a plurality of second open through holes in the low-hardness metal membrane by removing a part of the low-hardness metal membrane that is exposed via the first open through holes.

* * * * *